United States Patent [19]

Matsuda et al.

[11] Patent Number: 5,790,419
[45] Date of Patent: Aug. 4, 1998

[54] FAIL-SAFE SYSTEM AND METHOD OF OPERATION

[75] Inventors: Yasuyoshi Matsuda; Naohiro Nakatsuji, both of Yokkaichi, Japan

[73] Assignee: Sumitomo Wiring Systems, Ltd., Japan

[21] Appl. No.: 713,246

[22] Filed: Sep. 12, 1996

[30] Foreign Application Priority Data

Oct. 5, 1995 [JP] Japan ..................... 7-258572

[51] Int. Cl.$^6$ ........................................... H02J 9/00
[52] U.S. Cl. .................. 364/492; 364/184; 364/480; 364/481; 395/182.21; 395/182.22; 395/185.04; 395/182.13
[58] Field of Search ..................... 364/492, 152, 364/153, 166, 174, 183, 184, 185, 480, 481, 484, 486, 550, 551.01, 579, 580; 395/183.06, 185.04, 185.08, 182.21, 182.13, 182.22, 182.08, 182.09; 388/903, 907.5, 908, 909; 318/563, 565, 609, 568.24, DIG. 2; 701/39, 43, 62, 76, 92, 97, 107; 361/18; 371/62

[56] References Cited

U.S. PATENT DOCUMENTS

| | | | |
|---|---|---|---|
| 5,042,833 | 8/1991 | Kawabata | 701/39 |
| 5,049,794 | 9/1991 | Okada et al. | 318/DIG. 2 |
| 5,216,938 | 6/1993 | Yamaguchi | 364/184 |
| 5,422,808 | 6/1995 | Catanese, Jr. et al. | 364/184 |
| 5,510,943 | 4/1996 | Fukunaga | 361/18 |

FOREIGN PATENT DOCUMENTS

| | | |
|---|---|---|
| 3-31065 | 2/1991 | Japan. |
| 7-291091 | 11/1995 | Japan. |
| 8-123710 | 5/1996 | Japan. |

*Primary Examiner*—Emanuel Todd Voeltz
*Assistant Examiner*—Hal D. Wachsman
*Attorney, Agent, or Firm*—Anthony J. Casella; Gerald E. Hespos; Ludomir A. Budzyn

[57] ABSTRACT

A system is provided to automatically terminate a fail-safe state. When an abnormality detection signal of Lo and a pulse having a frequency outside a specified range are input to set and reset terminals S, R of an R-S Flip-Flop (R-SFF) 24, respectively, a microcomputer 14 is determined to be in its abnormal state and an output of Hi is output from a Q output terminal of the R-SFF 24 to stop the operation of a motor 20. In this way, a so-called fail-safe state is established. When the abnormality detection signal of Hi and the pulse having a frequency within the specified range are input to the set and reset terminals S, R of the R-SFF 24, respectively, the microcomputer 14 is determined to have returned to its normal state and an output of Lo is output from the Q output terminal of the R-SFF 24 to resume the operation of the motor 20. Thus, the operation of the motor 20 can be controlled according to the operation of a power window switch 16.

12 Claims, 5 Drawing Sheets

FAIL-SAFE SYSTEM AND METHOD OF OPERATION

BACKGROUND OF THE INVENTION

1. Field of the Invention

The present invention relates to a fail-safe system in which a pulse of a given frequency from a controlling means for controlling the operation of loads is input to an abnormality detecting means, and unless the frequency of the pulse lies within a specified range, the abnormality detecting means resets the controlling means and a stopping device stops the operation of the loads upon assumption that an abnormality has occurred in the controlling means. The invention further relates to the use of the inventive fail-safe system.

2. Description of the Prior Art

A known fail-safe system for stopping the operation of loads such as a motor when an abnormality has occurred in a controlling means for controlling the operation of the loads is, for example, disclosed in Japanese Unexamined Patent Publication No. 3-31065. This system is constructed as shown in FIG. 5.

As shown in FIG. 5, a microcomputer 1 for controlling the operation of unillustrated loads outputs a pulse of a given frequency from a pulse output terminal Po in its normal state. A watchdog timer 2 monitors the frequency of the pulse from the microcomputer 1 and determines whether the microcomputer 1 is in its normal state or in its abnormal state depending upon whether the frequency lies within a specified range.

Upon occurrence of an abnormality in the microcomputer 1, a first fail signal is output to a fail-safe circuit 4 from a fail output terminal Pf of the microcomputer 1. Load driving devices such as a relay and a transistor are controllably brought into their inoperative states by the output of the fail-safe circuit 4.

On the other hand, when the microcomputer 1 experiences an abnormality such as a runaway, the output of the pulse from the microcomputer 1 is stopped or the frequency thereof varies, deviating from the specified range. Then, the watchdog timer 2 determines that an abnormality has occurred in the microcomputer 1 and outputs an abnormality signal of, e.g. low level (hereinafter, Lo). This abnormality signal of Lo is latched by a latch circuit 3 to hold a reset terminal RST of the microcomputer at Lo, thereby resetting the microcomputer 1. Simultaneously, an output signal of Lo from the latch circuit 3 is input to the fail-safe circuit 4 as a second fail signal. Thus, the microcomputer 1 is prevented from inadvertently resuming its operation when it is brought back to its normal state.

However, the above construction cannot return to its normal operative state unless a power source is turned on or the latch circuit 3 is reset. Thus, the return operation takes time.

An object of the present invention is to automatically terminate a fail-safe function, making a return operation unnecessary.

SUMMARY OF THE INVENTION

According to the invention there is provided a fail-safe system in which: the operation of a load is controlled by a controlling means for outputting a pulse train or pulse being indicative of a normal or abnormal state of the controlling means, the pulse from the controlling means is input to an abnormality detecting means which determines by means of the pulse whether the controlling means is in its abnormal state and outputs an abnormality detection signal of a first level upon determining the controlling means is in its abnormal state, and upon output of the abnormality detection signal of the first level, a reset signal is output to reset the controlling means and, at substantially the same time, a stopping means is caused to stop the operation of the load, wherein: the abnormality detection signal and the pulse are input to the stopping means, and the stopping means is caused to stop the operation of the load upon receipt of the abnormality detection signal of the first level and the pulse indicative of the abnormal state of the controlling means while being brought into an operative state upon receipt of the abnormality detection signal of a second level and the pulse indicative of normal state of the controlling means.

According to a preferred embodiment the pulse has a predetermined or predeterminable frequency and/or level and is indicative of the normal state of the controlling means, when the frequency and/or lies within a predetermined or predeterminable range.

Further preferably, the abnormality detecting means discriminates whether the frequency and/or level of the pulse lies within the predetermined or predeterminable range and determines that the controlling means is in its normal or abnormal state depending upon whether the frequency and/ or level of the pulse lies within the predetermined or predeterminable range or not.

Further preferably, the stopping means comprises an R-S flip-flop and wherein the abnormality detection signal and the pulse are input to set and reset terminals of the R-S flip-flop, respectively.

Most preferably, the abnormality detecting means comprises a watchdog timer, wherein the controlling means preferably comprises a microcomputer.

According to a preferred embodiment there is provided a fail-safe system in which:

the operation of a load is controlled by a controlling means for outputting a pulse which has a given frequency when the controlling means is in its normal state, the pulse from the controlling means is input to an abnormality detecting means which discriminates whether the frequency of the pulse lies within a specified range, determines that the controlling means is in its abnormal state unless the frequency of the pulse lies within the specified range, and outputs an abnormality detection signal of one level upon determining the controlling means is in its abnormal state, and upon output of the abnormality detection signal of the one level, a reset signal is output to reset the controlling means and, at the same time, a stopping means is caused to stop the operation of the load, wherein:

the abnormality detection signal and the pulse are input to the stopping means, and the stopping means is caused to stop the operation of the load upon receipt of the abnormality detection signal of the one level and the pulse having a frequency outside the specified range while being brought into an inoperative state upon receipt of the abnormality detection signal of the other level and the pulse having a frequency within the specified range.

Accordingly, upon receipt of the abnormality detection signal of the one level and the pulse having a frequency outside the specified range, the stopping means is caused to stop the operation of the load upon determination that the controlling means is in its abnormal state.

On the other hand, upon receipt of the abnormality detection signal of the other level and the pulse having a frequency within the specified range, the stopping means is brought into its inoperative state upon determination that the controlling means is in its normal state. Accordingly, in the case that the controlling means is conformed to have returned to its normal state while the operation of the load is stopped by the stopping means, the operation of the load can be automatically resumed without performing a return operation unlike the prior art fail-safe system.

As described above, upon receipt of the abnormality detection signal of one level and the pulse having a frequency outside the specified range, the stopping means is caused to stop the operation of the load upon determination that the controlling means is in its abnormal state. Upon receipt of the abnormality detection signal of the other level and the pulse having a frequency within the specified range, the stopping means allows the load to resume its operation upon determination that the controlling means is in its normal state. Accordingly, the fail-safe state can be automatically terminated, thereby obviating the need for a return operation unlike the prior art fail-safe system. Thus, the reliability of the system can be improved.

Preferably, the stopping means may comprise an R-S flip-flop and wherein the abnormality detection signal, and the pulse may be input to set and reset terminals of the R-S flip-flop, respectively.

It is effective to construct the abnormality detecting means by a watchdog timer and to construct the controlling means by a microcomputer.

According to the invention, there is further provided a use of a fail-safe system according to the invention for a control circuit of an electric equipment for an automotive vehicle, in particular for a control circuit of an electrically powered window and/or for a wiper control circuit.

BRIEF DESCRIPTION OF THE DRAWINGS

These and other objects, features and advantages of the present invention will become more apparent upon a reading of the following detailed description and accompanying drawings in which.

DETAILED DESCRIPTION OF THE PREFERRED EMBODIMENT

Figure 1:
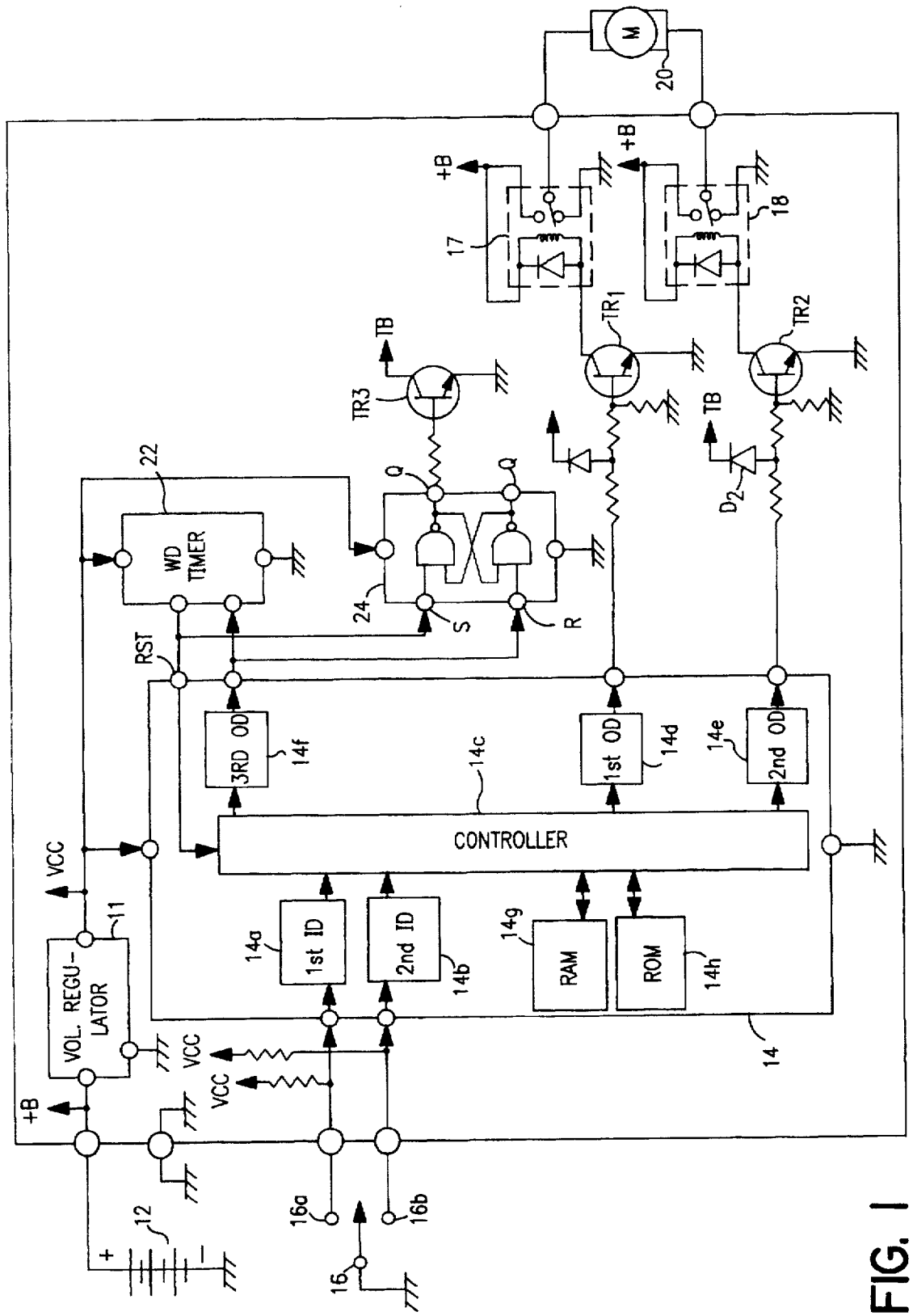
FIG. 1 is a block diagram of one embodiment of the invention.

FIG. 1 shows an example in which a fail-safe system is applied to a power window controller of an automotive vehicle. As shown in FIG. 1, a voltage from a battery 12 is regulated to a specified value by a voltage regulator 11 and supplied to a microcomputer 14 as a controlling means and to other elements. A signal corresponding to the state of a power window switch 16 is input to the microcomputer 14. An UP terminal 16a and a DOWN terminal 16b of the power window switch 16 are connected with an output terminal of the voltage regulator 11 via pull-up resistors and are also connected with a controller 14c via first and second input devices 14a, 14b of the microcomputer 14, respectively. The controller 14c determines via the first or second input device 14a or 14b whether the power window switch 16 is switched to the UP terminal 16a or the DOWN terminal 16b or is in its neutral state.

If the power window switch 16 is switched to the UP terminal 16a or the DOWN terminal 16b, the controller 14c inputs a control signal of high level (hereinafter, Hi) to a base of a first or second transistor TR1 or TR2 of npn-type via a first or second output device 14d or 14e of the microcomputer 14 and a corresponding current-limiting resistor. When the transistor TR1 or TR2 is turned on, an up-side relay 17 or a down-side relay 18 operates, causing a current from the battery 12 to flow into a motor 20 as a load in an up-direction or down-direction. In this way, the motor 20 is driven in one direction or the other and the window is closed or opened. The bases of the first and second transistors TR1, TR2 are connected with a collector of a third transistor TR3 to be described later via anodes and cathodes of diodes D1, D2, respectively.

A watchdog timer 22 as an abnormality detecting means is provided to monitor whether the microcomputer 14 is in its normal state. A pulse train comprising at least one pulse or pulse group or pulse chain or a pulse of a given frequency from the controller 14c is input to the watchdog timer 22 via a third output device 14f of the microcomputer 14. The watchdog timer 22 determines whether the frequency of the pulse lies within a specified range. If the microcomputer 14 is in its normal state, the pulse frequency lies within the specified range. If the microcomputer 14 is in its abnormal state, the pulse frequency varies, deviating from the specified range. Upon determining that the frequency of the pulse from the microcomputer 14 lies outside the specified range, the watchdog timer 22 outputs an abnormality signal of Lo to the controller 14c via the reset terminal RST of the microcomputer 14, thereby resetting the microcomputer 14.

On the other hand, the abnormality signal from the watchdog timer 22 and the pulse from the microcomputer 14 are input to set and reset terminals S, R of an R-S flip-flop (hereafter, R-SFF) 24, respectively. The state of a Q output terminal (and the state of a $\bar{Q}$ output terminal) of the R-SFF 24 is determined in accordance with a truth table shown in TABLE-1 below. When the Q output terminal is Hi, the third transistor TR3 of npn type having a base connected with the Q output terminal and a grounded emitter is turned on, with the result that the bases of the first and second transistors TR1, TR2 are grounded. Thus, despite a control signal of Hi from the microcomputer 14, the first and second transistors TR1, TR2 are not turned on, thereby forcibly stopping the operation of the motor 20.

TABLE 1

| MODE | INPUT | | OUTPUT | | OPERATION |
|------|---|---|---|---|---|
|      | S | R | Q | $\bar{Q}$ |  |
| (1) | L | L | H | H | PROHIBITED |
| (2) | L | H | H | L | SET |
| (3) | H | L | L | H | RESET |
| (4) | H | H | NO CHANGE | | HOLD |

Identified by 14g and 14h in FIG. 1 are a RAM and a ROM built in the microcomputer 14 to store data and to store a variety of control programs, respectively.

The logic of the R-SFF 24 is described below. In the case that the microcomputer 14 normally operates, the signal input from the watchdog timer 22 to the set terminal S is Hi. Accordingly, if the pulse input to the reset terminal R is Hi, a mode (4) of TABLE-1 is set and the state of the Q output terminal does not change. If the pulse input to the reset terminal R is Lo, a mode (3) of TABLE-1 is set and the state of the Q output terminal changes to Lo.

At this time, the low state of the Q output terminal does not turn the third transistor TR3 on. Thus, the first and second transistors TR1, TR2 are on-off controlled in accordance with the control signal from the microcomputer 14 to drive the motor 20.

On the other hand, in the case that the microcomputer 14 experiences a runaway or hang-up (e.g. due to a variation of a supply voltage, when electrical loads are switched on and/or off, or due to an electrostatic discharge, when a person touches a switch, a cable or the like, or due to a current induced by a strong electromagnetic wave from a broadcasting station or radio, or due to similar causes), the output from the microcomputer 14 to the watchdog timer 22 changes to Hi (pull-up state) or Lo (pull-down state), causing the frequency of the pulse from the microcomputer 14 to deviate from the specified range. As a result, the output from the watchdog timer 22 to the microcomputer 14 changes to Lo, changing the state of the set terminal S to Lo. When the output from the microcomputer 14 to the reset terminal R is Hi, the mode (4) of TABLE-1 changes to a mode (2) and the Q output terminal changes to Hi. When the output to the reset terminal R is Lo, the mode (3) of TABLE-1 changes to a mode (1) and the Q output terminal also changes to Hi, setting a fail-safe state.

At this time, the high state of the Q output terminal turns the third transistor TR3 on, with the result that the bases of the first and second transistors TR1, TR2 are grounded. Thus, despite the control signal of Hi from the microcomputer 14, the first and second transistors TR1, TR2 are not turned on, thereby forcibly stopping the operation of the motor 20 as a load.

In the case of a runaway when the state of the reset terminal R is Hi, the microcomputer 14 returns to its normal state as follows. The mode (2) changes to the mode (4) after the signal input from the watchdog timer 22 to the set terminal S changes from Lo to Hi. The mode (4) is held until the output pulse stabilizes after the microcomputer 14 returns to its normal state. During this time, the Q output terminal is held at Hi, i.e. at a fail-safe value. Thereafter, when the microcomputer 14 completely returns to its normal state and the output pulse stabilizes, the modes (3) and (4) alternately change according to an alternating change of the state of the reset terminal R between Lo and Hi. Accordingly, the Q output terminal is held at Lo, keeping the third transistor TR3 off. Thus, the fail-safe state is terminated.

On the other hand, the microcomputer 14 returns to its normal state as follows in the case of a runaway when the state of the reset terminal R is Lo. The mode (1) of TABLE-1 changes to the mode (3) after the signal input from the watchdog timer 22 to the set terminal S changes from Lo to Hi. The mode (3) is held until the output pulse stabilizes after the microcomputer 14 returns to its normal state. During this time, the state of the Q output terminal changes from Hi to Lo, i.e. it is not fixed at the fail-safe value. Accordingly, a program is set such that the output pulse of the microcomputer 14 is fixed at Hi until it stabilizes after the microcomputer 14 returns to its normal state. This causes the reset terminal R to be fixed at Hi during this time, and the mode (1) of TABLE-1 changes to the mode (4) and the Q output terminal is held at Hi, i.e. at the fail-safe value. Thereafter, when the microcomputer 14 completely returns to its normal state and the output pulse stabilizes, the modes (4) and (3) alternately change according to an alternating change of the state of the reset terminal R between Lo and Hi. Accordingly, the Q output terminal is held at Lo, keeping the third transistor TR3 off. Thus, the fail-safe state is terminated.

Figure 2:
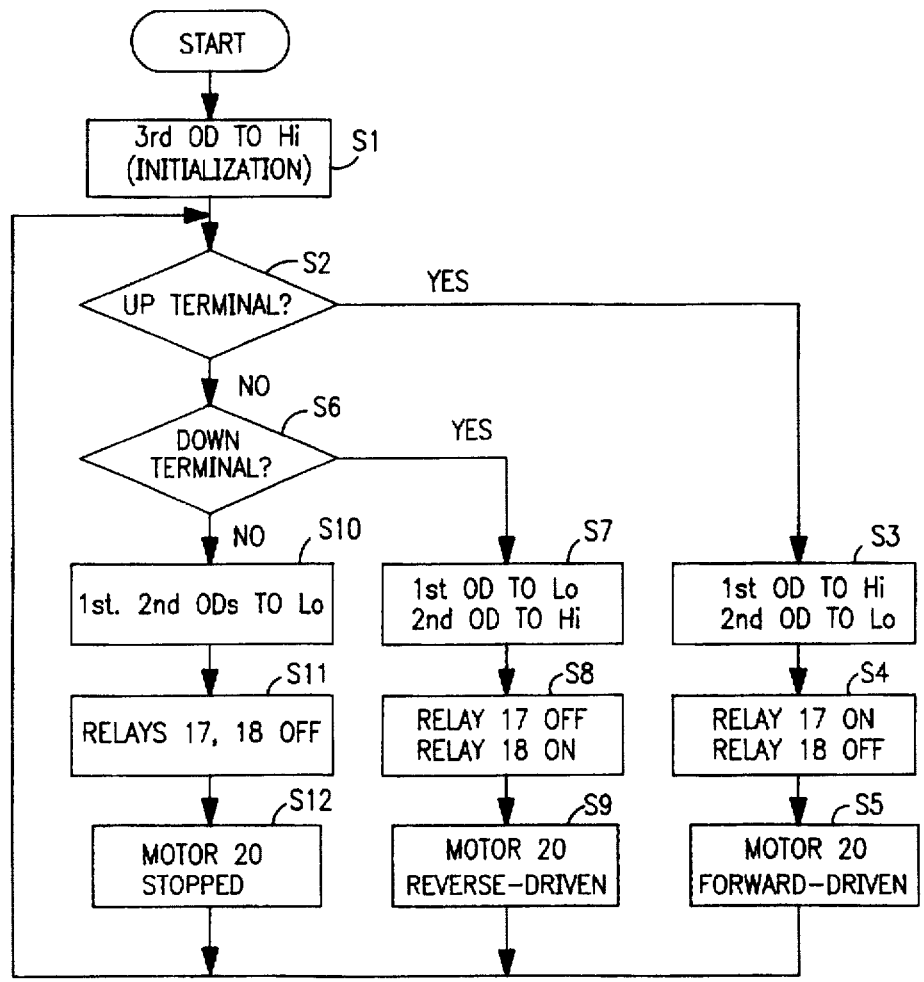
FIGS. 2 to 4 are flow charts showing the operation of the embodiment of FIG. 1.

Next, a series of operations are described with reference to flow charts shown in FIGS. 2 to 4.

First, a normal operation when the microcomputer 14 is in its normal state is described. As shown in FIG. 2, upon initial power application, the microcomputer 14 is reset to start an operation. Then, as an initialization, the output of the third output device 14f is set to Hi (Step S1).

Whether the power window switch 16 is switched to the UP terminal 16a is then discriminated (Step S2). If the discrimination result is in the affirmative, the outputs of the first and second output devices 14d, 14e are set to Hi and Lo, respectively (Step S3). Then, the first transistor TR1 is turned on, thereby turning the up-side relay 17 on, and the second transistor TR2 is turned off, thereby turning the down-side relay 18 off (Step S4). As a result, the motor 20 is driven in a forward direction (Step S5) and then Step S2 follows.

Figure 3:
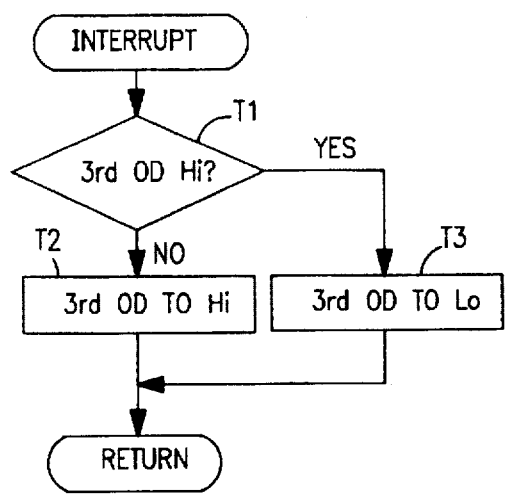

After the initialization of the microcomputer 14, the system enters an interrupt routine shown in FIG. 3. This interrupt routine is repeatedly implemented at specified intervals of, e.g. 10 ms. Specifically, as shown in FIG. 3, whether the output of the third output device 14f is Hi is discriminated (Step T1). The output of the third output device 14f is set to Hi (Step T2) if the discrimination result is in the negative, whereas it is set to Lo (Step T3) if the discrimination result is in the affirmative. Thereafter, the system reenters the main routine (FIG. 2).

Referring back to FIG. 2 showing the main routine, if the discrimination result in Step S2 is in the negative, whether the power window switch 16 is switched to the DOWN terminal 16b is discriminated (Step S6). If this discrimination result is in the affirmative, the outputs of the first and second output devices 14d, 14e are set to Lo and Hi, respectively (Step S7). Then, the first transistor TR1 is turned off, thereby turning the relay 17 off, and the second transistor TR2 is turned on, thereby turning the relay 18 on (Step S8). As a result, the motor 20 is driven in a reverse direction (Step S9) and then Step S2 follows.

On the other hand, if the discrimination result in Step S6 is in the negative, the outputs of the first and second output devices 14d, 14e are both set to Lo (Step S10). Then, the first and second transistors TR1, TR2 are both turned off, thereby turning both relays 17, 18 off (Step S11). As a result, the motor 20 is stopped and then Step S2 follows.

Next, the fail-safe operation is described.

Figure 4:
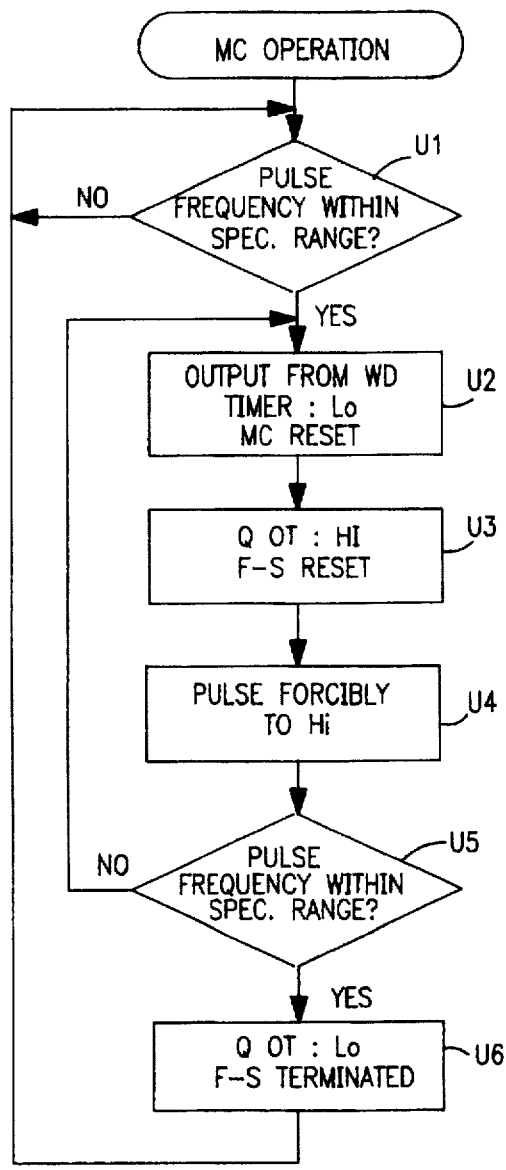
Figure 5:
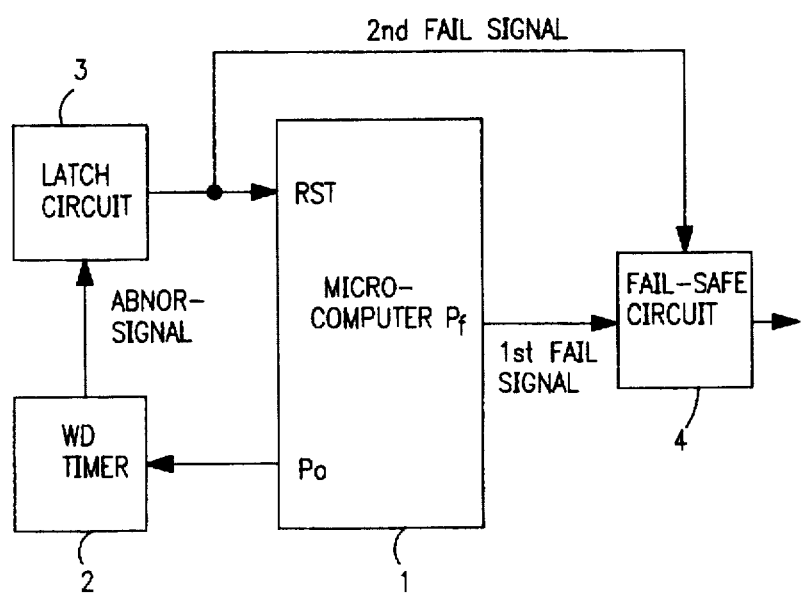
FIG. 5 is a block diagram of a prior art fail-safe system.

As shown in FIG. 4, during the operation of the microcomputer 14, the watchdog timer 22 monitors the frequency of the pulse from the microcomputer 14 and discriminates whether the pulse frequency lies outside the specified range (Step U1). The microcomputer 14 is discriminated to be in its normal state if the discrimination result is in the negative, and the discrimination of Step U1 is repeated. On the other hand, if the discrimination result is in the affirmative, the microcomputer 14 is in its abnormal state. Accordingly, a signal of Lo is input from the watchdog timer 22 to the reset terminal RST of the microcomputer 14 to reset to the microcomputer 14 (Step U2). Simultaneously, the set terminal S of the R-SFF 24 changes to Lo, causing the Q output terminal Q to set to Hi as described above. As a result, the fail-safe state is started (Step U3).

Subsequently, the pulse to the watchdog timer 22 is forcibly set to Hi (Step U4). Then, the microcomputer 14 returns to its normal state, and whether the frequency of the output pulse of the microcomputer 14 lies within the specified range is discriminated (Step U5). If the discrimination result is in the negative, Step U2 follows upon determination that the microcomputer has not yet returned to its normal state. If the discrimination result is in the affirmative, upon determination that the microcomputer 14 has returned to its normal state, the Q output terminal of the R-SFF 24 is set to Lo as described above, thereby terminating the fail-safe state (Step U6). Then, Step U1 follows.

According to this embodiment, when the abnormality signal of Lo and the pulse of a frequency lying outside the specified range are input to the set and reset terminals S, R of the R-SFF 24, respectively, the microcomputer 14 is discriminated to be in its abnormal state. Then, a Hi output from the Q output terminal of the R-SFF 24 causes the operation of the motor 20 as a load to be stopped. In this way, the so-called fail-safe state is established. When the abnormality signal of Hi and the pulse of a frequency lying within the specified range are input to the set and reset terminals S, R of the R-SFF 24, the microcomputer 14 is discriminated to have returned to its normal state, and a Lo output from the output terminal Q of the R-SFF 24 allows the motor 20 to resume its operation. Since the operation of the motor 20 is controlled according to the operation of the power window switch 16, the fail-safe state can be automatically terminated, eliminating the need for the return operation which is necessary with the prior art fail-safe system.

The construction of the stopping means by the R-SFF 24 and that of the abnormality detecting means by the watchdog timer 22 enable these means to be formed into an integrated circuit. Accordingly, the fail-safe system can be formed into a single unit, which is greatly effective in suppressing a dark current.

Although the foregoing embodiment is described with respect to a case where the Q output of the R-SFF 24 is used, the $\bar{Q}$ output may be used.

Further, the constructions of the abnormality detecting means and the stopping means are not limited to the watchdog timer and the R-SFF.

What is claimed is :

1. A method of operating a fail-safe system in cooperation with a control circuit for controlling the operation of a load, comprising the steps of:

driving the operation of said load and controlling the driving with said control circuit;

producing a first signal indicative of the normal operation and a second signal indicative of the abnormal operation of said control circuit;

responsive to the receipt by said fail-safe system of said first signal outputting an abnormality-detection signal of a first level, and responsive to the receipt of said second signal outputting an abnormality-detection signal of a second level;

responsive to the outputting of an abnormality-detection signal of a second level, resetting said control circuit to normal operation; and responsive to an abnormality-detection signal of a second level causing the driving of the operation of said load to stop and responsive to an abnormality-detecting signal of a first level causing the re-start of the operation of said load after the resetting of said control circuit to normal operation in response to the outputting of an abnormal-detection signal of a second level.

2. The method of claim 1, wherein the step of producing a first signal indicative of the normal operation and a second signal indicative of the abnormal operation of said control circuit comprises determining whether the frequency of a pulse output by said control circuit lies within a predetermined or predeterminable range or not.

3. The method of claim 1, wherein the step of producing a first signal indicative of the normal operation and a second signal indicative of the abnormal operation of said control circuit comprises determining whether the level of a pulse output by said control circuit lies within a predetermined or predeterminable range or not.

4. A fail-safe system for controlling the operation of a load, comprising:

driving means for driving the operation of said load;

controller means, coupled to said driving means for controlling the operation of said load, and producing a first signal indicative of the normal operation and a second signal indicative of the abnormal operation of said controller means;

abnormality detecting means, coupled to said controller means and responsive to the receipt of said first signal, for outputting an abnormality-detection signal of a first level, and responsive to the receipt of said second signal for outputting an abnormality-detection signal of a second level;

resetting means, responsive to the outputting of an abnormality-detection signal of a second level, for resetting said controller means to normal operation; and stopping means, coupled between said abnormality-detecting means and said driving means for causing said driving means to stop and start the operation of said load, and responsive to an abnormality-detection signal of a second level for causing said driving means to stop the operation of said load and responsive to an abnormality-detecting signal of a first level for causing said driving means to re-start the operation of said load after the resetting of said controller means by said resetting means.

5. A system as in claim 4, wherein said stopping means comprises an R-S flip-flop having set and reset terminals and wherein said first and second signals are input to said set terminals and said abnormality-detection signal of a first level and said abnormality-detecting signal of a second level are input to said reset terminal.

6. A system as in claim 4, wherein said controller means comprises a microcomputer.

7. A system as in claim 4, wherein said abnormality detecting means comprises a watchdog timer.

8. A system as in claim 4, wherein said driving means comprises:

first and second npn-type transistors;

first and second current-limiting resistors respectively coupling said first and second transistors to said controller means; and first and second relays respectively connected to said first and second transistors and operated in response to the conduction of their respective transistors for communicating a driving voltage to drive said load.

9. A system as in claim 8, wherein said stopping means comprises a third transistor coupled to said first and second transistors for disabling conduction by said first and second transistors when said third transistor is conducting.

10. A system as in claim 4, wherein said stopping means comprises an R-S flip-flop having set (S) and reset (R) input terminals and Q and Q' output terminals and wherein said first and second signals have a first level and a second level and are input to said set terminal (S) and said abnormality-detection signal of a first level and said abnormality-detecting signal of a second level are input to said reset terminal (R) and the output signals from said flip-flop control the operation of said load as follows:

| INPUT | | OUTPUT | | OPERATION |
|---|---|---|---|---|
| S | R | Q | Q' | |
| L | L | H | H | PROHIBITED |
| L | H | H | L | SET |
| H | L | L | H | RESET |
| H | H | NO CHANGE | | HOLD | where H is a high level and L is a low level.

11. A system as in claim 4, wherein said load comprises a motor means for operating a power window.

12. A system as in claim 4, wherein said load comprises a motor means for operating a windshield wiper.

* * * * *